United States Patent [19]
Oh

[11] Patent Number: 6,110,039
[45] Date of Patent: Aug. 29, 2000

[54] SHOOTING GAME MACHINE

[75] Inventor: Ketsu Oh, Kobe, Japan

[73] Assignee: Konami Co., Ltd., Hyogo-ken, Japan

[21] Appl. No.: 09/026,217

[22] Filed: Feb. 19, 1998

Related U.S. Application Data

[63] Continuation of application No. 08/604,515, Feb. 21, 1996, abandoned.

[30] Foreign Application Priority Data

Feb. 21, 1995 [JP] Japan ...................................... 7-55225

[51] Int. Cl.[7] ................................. A63B 67/00; A63F 9/02
[52] U.S. Cl. ................................................. 463/2; 463/53
[58] Field of Search .......................... 463/1–2, 5, 30–39, 463/49, 51–53; 434/16, 19–24; 364/410.1, 411.1; 340/323 R; 250/215

[56] References Cited

U.S. PATENT DOCUMENTS 3,996,674 12/1976 Pardes et al. ............................. 434/22

*Primary Examiner*—Valencia Martin-Wallace
*Assistant Examiner*—Marle Sager
*Attorney, Agent, or Firm*—Jordan and Hamburg LLP

[57] ABSTRACT

A shooting game machine includes: a display device having a display screen for displaying a target; a hitting device which hits the target; a reference disposed in the vicinity of the display screen; an image pick-up device which picks up an image in an image area located in a hitting direction of the hitting device; a reference position detector which detects the position of the reference within the image picked up by the image pick-up device; and a hit position detector which detects the position on the display screen hit by the hitting device based on the position of the reference detected by the reference position detector.

20 Claims, 13 Drawing Sheets

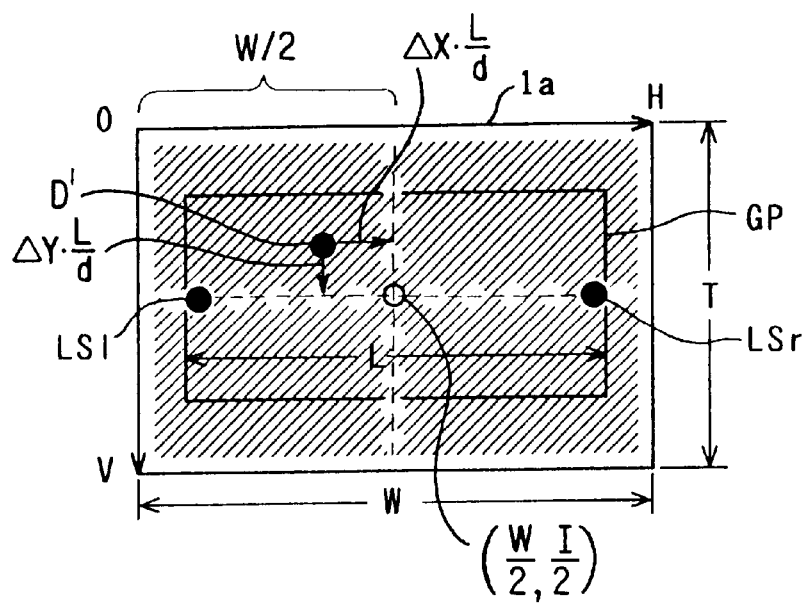
FIG. 4A
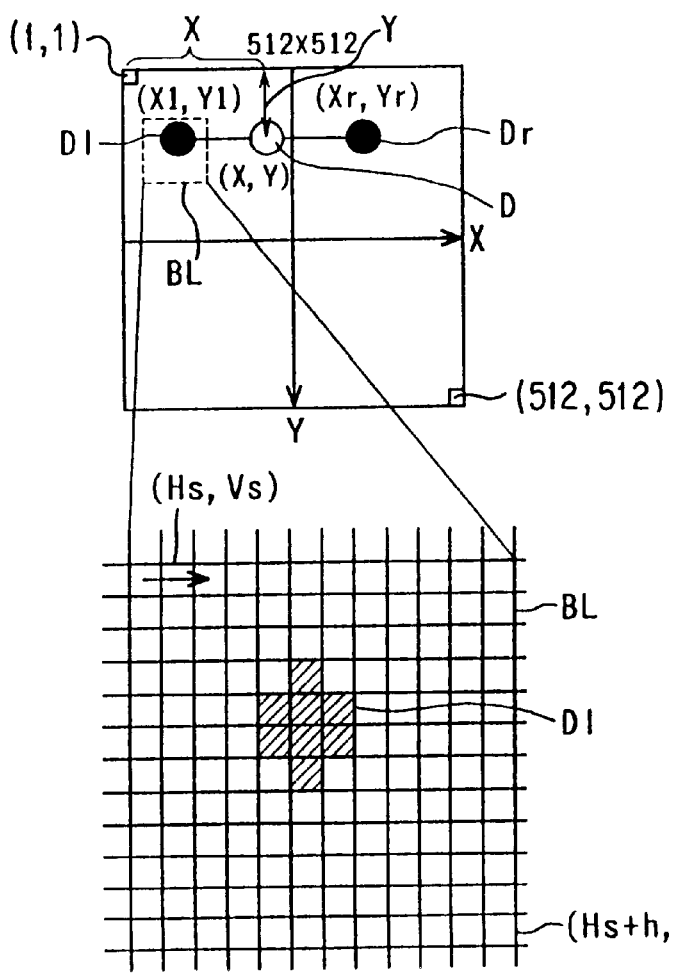
FIG. 4B
FIG. 4C

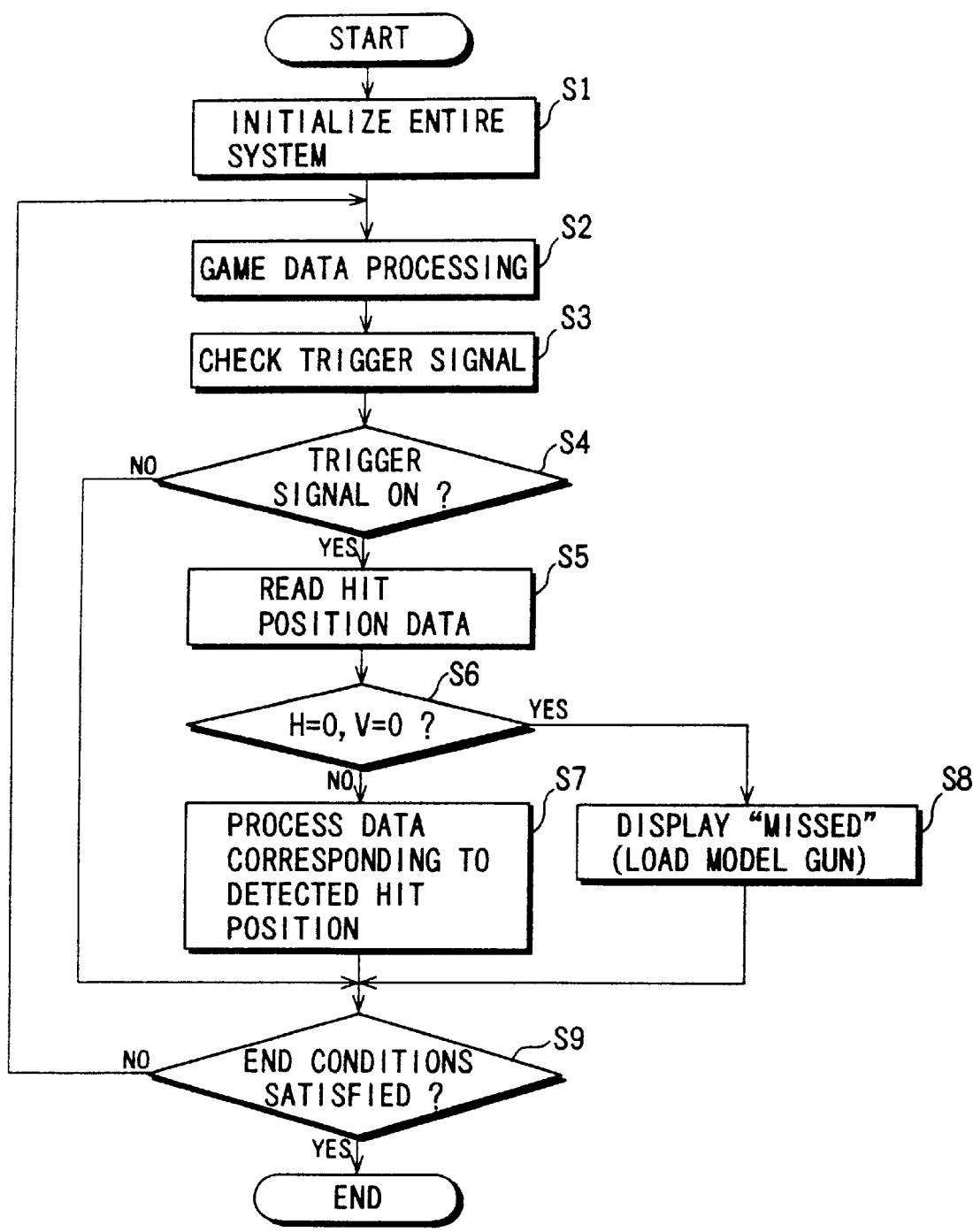

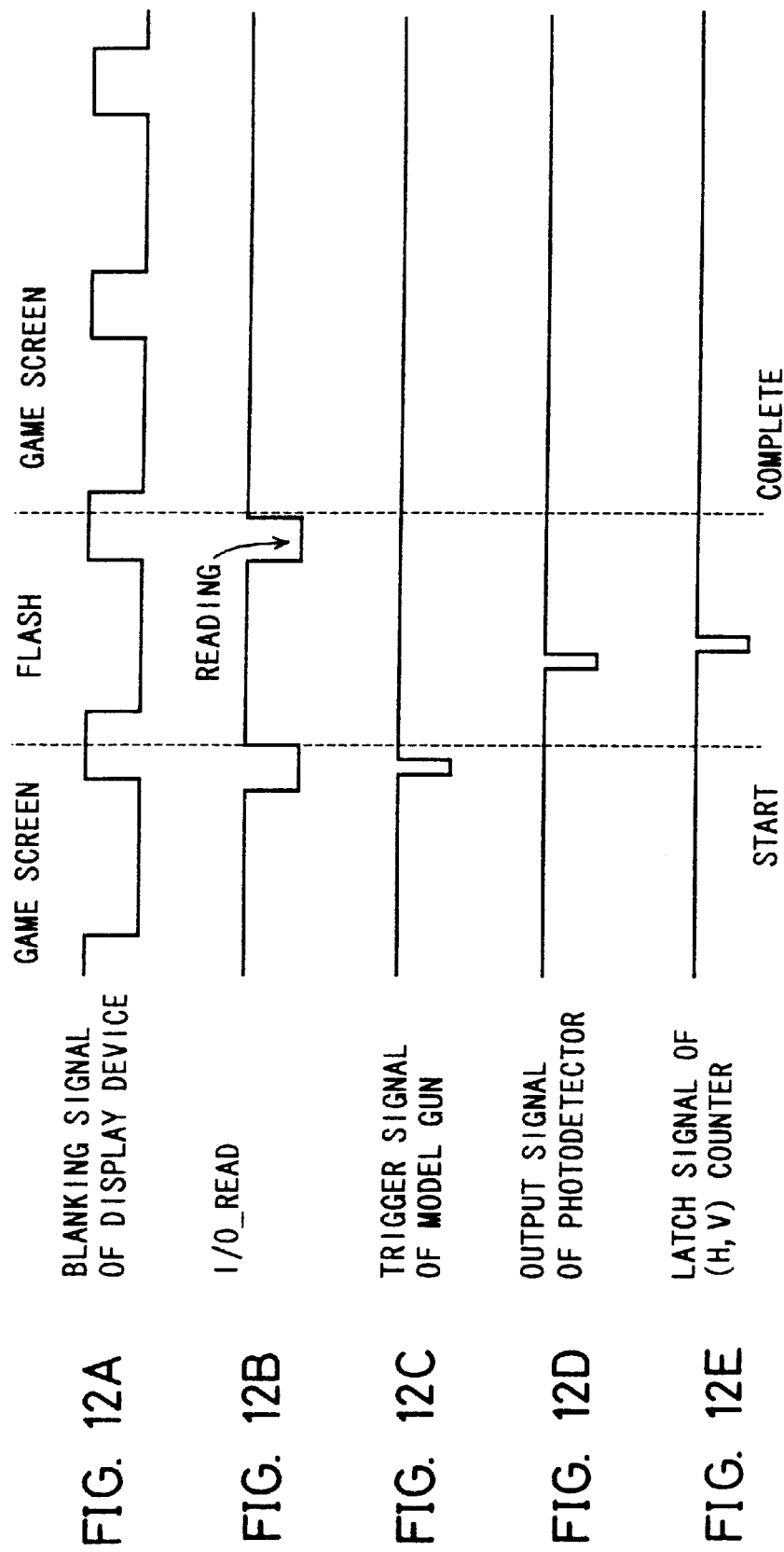

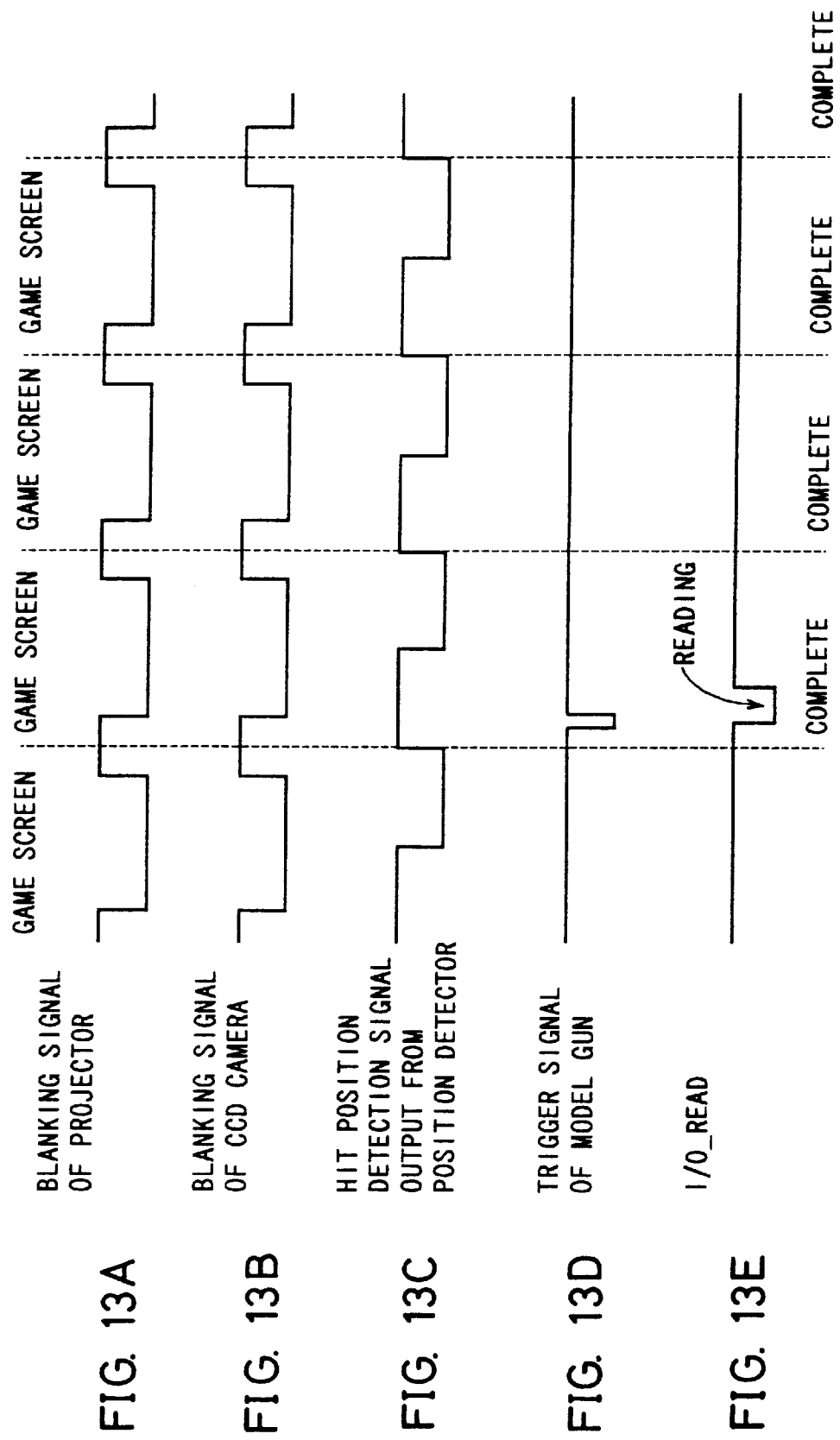

SHOOTING GAME MACHINE

This is a continuation of application Ser. No. 08/604,515, filed Feb. 21, 1996, now abandoned.

BACKGROUND OF THE INVENTION

This invention relates to a shooting game machine with which a target displayed on a display screen is targeted by a model gun and a development of game is controlled in accordance with a positional relationship between a targeted position and the target.

Prior art shooting game machines of this type are such that a model gun is provided with a photodetector; a display screen of a display device turns white at the same time a player pulls a trigger of the model gun; raster scanning is performed to the white screen image from one corner of the display device; and a targeted position is detected based on a timing at which the photodetector receives light from the raster scanning screen (i.e. raster scanning position).

However, the above prior art machines have the following problems.

(1) The display screen turns white every time the trigger of the model gun is pulled, and the intensity of the light from the white screen strongly stimulates the player's eyes, thereby standing as a hindrance to an improvement in the quality of the game screen image and dazzling the player.

(2) Since the targeted position cannot be detected unless the screen is switched to the white screen, it is difficult to continuously detect the targeted position such as a display of the targeted position during calibration. In other words, even if the game screen image and the white screen image are alternately displayed, the continuous detection can be performed at an interval twice as long as a writing cycle of the game screen image.

In view of the above problems, there has been proposed a shooting game machine in which an image from a display device is reflected by a semitransparent mirror; light emitting elements are arranged in a matrix behind the semitransparent mirror such that the lights from the light emitting elements are superimposed on the image; and a targeted position is detected based on a position where the light from the light emitting element is received (see Japanese Unexamined Utility Model Publication No. 2-65983). However, this machine necessitates a multitude of light emitting elements arranged in a matrix and an accurate positioning of the light emitting elements with respect to the image from the display device, thereby making the construction complicated and requiring precise assemblage and arrangement.

There is also known a shooting game machine in which a targeted position is detected by detecting the position of a light source disposed in the middle of a shooting target by means of a semiconductor position detector provided in a model gun (see Japanese Unexamined Patent Publication No. 60-111676). The light source can be disposed in the fixed middle position because the target is fixed. However, this concept cannot be applied to a shooting game machine having a game screen image which changes moment by moment, or a target having a position which changes moment by moment.

SUMMARY OF THE INVENTION

It is an object of the present invention to provide a shooting game machine which has overcome the problems residing in the prior art.

It is another object of the present invention to provide a shooting game machine which can accurately detect a targeted position of a model gun and which has a simple construction.

The present invention is directed to a shooting game machine comprising a display device having a display screen for displaying a target, and a targetting device for targetting the target, and further comprising at least one reference disposed in the vicinity of the display screen, an image pick-up device which picks up an image in an image area facing the targetting device, a reference position detector which detects the position of the reference within the image picked up by the image pick-up device, and a targeted position detector which detects the position on the display screen targeted by the targetting device based on the position of the reference detected by the reference position detector.

In the case that the image pick-up device includes image receiving elements arranged in a matrix for receiving electromagnetic waves from the image area for each scanning, the reference position detector may detect the position of the reference in accordance with an image signal output from the image pick-up device for each scanning.

Further, in the case that the reference position detector includes a frame memory for storing the image signal output from the image pick-up device, and an area designator for designating at least a partial area of the frame memory, the reference position detector may read contents stored in the area of the frame memory designated by the area designator and detect the position of the reference based on the read contents.

Furthermore, in the case that the reference position detector includes a counter for counting the number of image receiving elements which detected the image of the reference based on the contents stored in the area of the frame memory designated by the area designator, and a coordinate values integrator for integrating coordinate values of the image receiving elements in the frame memory which were counted by the counter, the reference position detector may detect the position of the reference based on outputs of the counter and the coordinate value integrator.

There may be provided at least two references. In such a case, the area designator preferably designates the area in accordance with the image signal from the image pick-up device such that only one reference is located within one area.

There may also be provided a distance estimator for estimating a distance between the hitting device and the display screen based on a distance between the references in the image pick-up device and an actual distance between the references. Further, in the case that the reference(s) emit(s) the electromagnetic waves having a wavelength outside the range of visible rays. the image pick-up device may selectively receive the electromagnetic waves from the reference(s).

These and other objects, features and advantages of the present invention will become more apparent upon a reading of the following detailed description and accompanying drawings.

BRIEF DESCRIPTION OF THE DRAWINGS

FIGS. 4A to 4C are diagrams showing the operation of a data integrator, FIG. 4A showing a display screen within a field of view of a CCD camera, FIG. 4B showing an image obtained by the CCD camera when an image on the display screen is picked up, and FIG. 4C showing an enlarged count block;

FIG. 5 is a flowchart showing the operation of a program implemented by a game controller;

FIGS. 12A to 12E are timing charts of main signals used in a prior art shooting game machine; and FIGS. 13A to 13E are timing charts of main signals used in the shooting came machine.

DETAILED DESCRIPTION OF THE INVENTION

Hereafter, one embodiment of the invention is described in detail with reference to the accompanying drawings.

Figure 1:
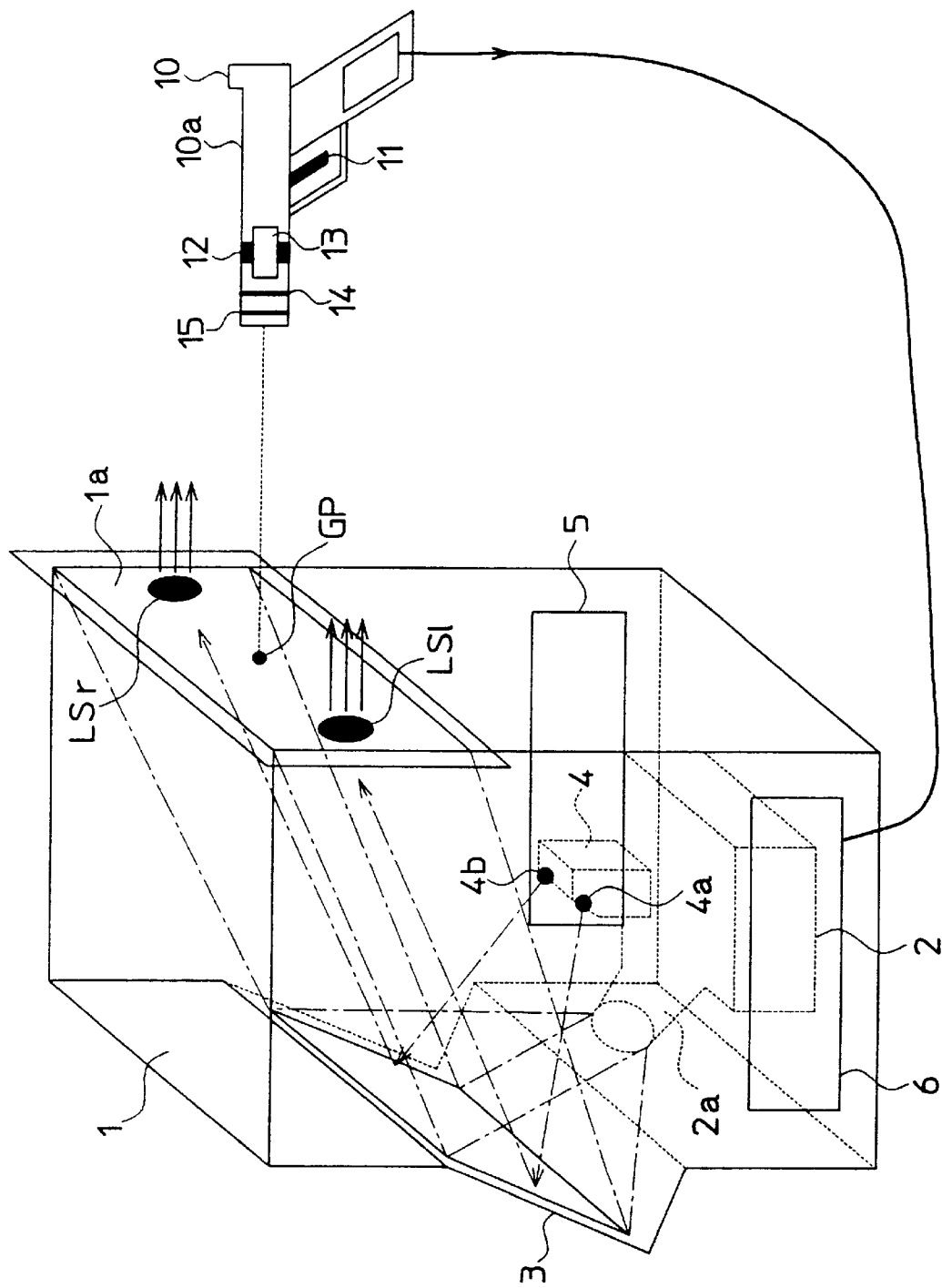
FIG. 1 is a perspective view showing an entire construction of a shooting game machine as one embodiment of the invention.
Figure 2:
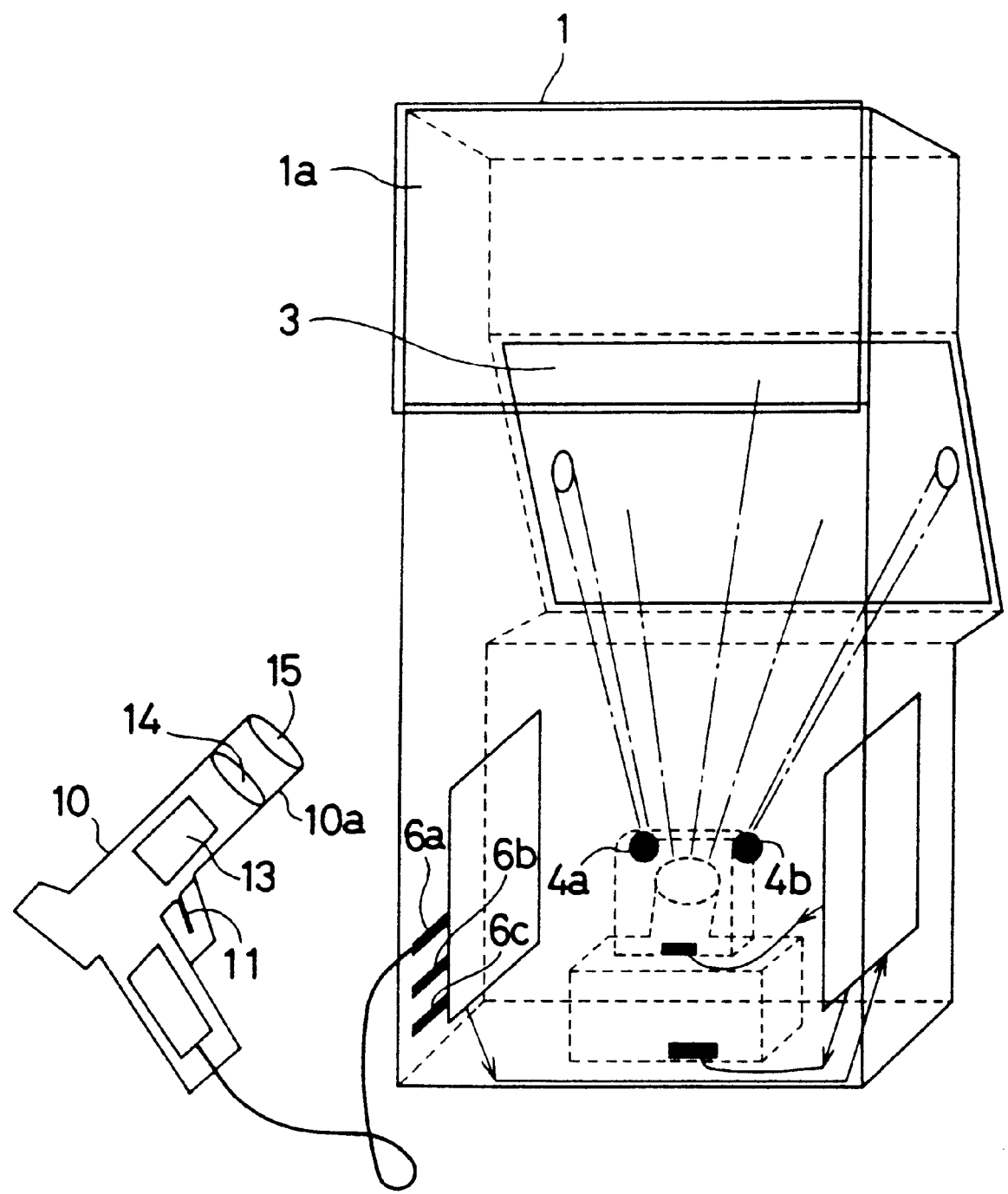
FIG. 2 is another perspective view showing the entire construction of the shooting game machine.

FIGS. 1 and 2 are perspective views showing an entire construction of a shooting game machine according to one embodiment of the invention. In FIGS. 1 and 2, indicated at 1 is a frame of the game machine. A display screen 1a is provided on the front surface of the frame 1. A projector 2 is housed in the frame 1 and projects a light for generating a game screen image forward of a projecting portion 2a in accordance with a video signal from a game controller 5 to be described later. In this embodiment, the light from the projector 2 is projected backward of the frame 1, and has its path turned forward of the frame 1 by a semitransparent mirror 3 disposed in the rear portion of the frame 1, consequently being projected on the display screen 1a. In this way, the game screen image is displayed on the display screen 1a.

Indicated at 4 is an infrared projector housed in the frame 1. As particularly clearly shown in FIG. 2, infrared spot beams are projected from a pair of projecting portions 4a, 4b disposed side by side. In this embodiment, the pair of infrared beams from the infrared projector 4 are also projected backward of the frame 1, and have their paths turned forward of the frame 1 by the semitransparent mirror 3, consequently being projected on the display screen 1a. The projected positions of infrared spot beams LS can be freely adjusted by changing the position of the infrared projector 4 or the paths of the beams projected from the projector 4. It should be noted that the projected position of the infrared spot beams LS are fixed at the opposite lateral end positions of the display screen 1a (see FIGS. 2 and 4A). Since the infrared beams have a wavelength outside the range of visible rays, a player cannot see them.

Indicated at 5 is the game controller which is preferably formed on a single substrate. The game controller 5 includes a ROM for storing a game program, etc., a RAM for storing variables necessary to implement the game program, a processor for implementing the game program and generating necessary game screen images, and other necessary peripheral circuits such as an interface. To the game controller 5 is input a targeted position data of a model gun 10 from a position detector 6. The game controller 5 sends a video signal used to generate a game screen image and a power signal used to turn the projecting portions on to the projector 2 and the infrared projector 4, respectively. The game screen images refer to still images and animated images including a targeted to be targeted by the model gun 10.

Indicated at 6 is the position detector which is preferably formed on a single substrate. The position detector 6 detects the targeted position of the model gun 10 in accordance with an image signal from the model gun 10, and outputs the targeted position data to the game controller 5. In this embodiment, the position detector 6 is formed with three image signal input ports 6a to 6c as shown in FIG. 2. Maximum 3 model guns are connectable with the position detector 6. The detail of the position detector 6 is described later.

Indicated at 10 is the model gun simulating the shape of a real gun. The model gun 10 is provided with a pivotal trigger 11 similar to a real gun. The model gun 10 has a built-in trigger signal generator (not shown) for generating a trigger signal when the player pulls the trigger 11. The trigger signal is input to the game controller 5 via the position detector 6.

A CCD camera 13 is provided in a muzzle 10a of the model gun 10 via a vibration isolating member 12 of rubber or like material. The CCD camera 13 includes a CCD sensor (not shown) as an image pick-up device and creates an image based on a light intensity distribution on a light receiving surface of the sensor. In this embodiment, there is used, as the CCD camera 13, a CCD area sensor having a sensitivity which covers a sufficiently large wavelength range including a range of infrared rays. The CCD camera 13 is disposed in the model gun 10 such that it can pick up an image spreading in front of the muzzle 10a of the model gun 10 along the extension of the muzzle 10a. An image signal representative of an image picked up by the CCD camera 13 is output to the position detector 6. In this embodiment, the CCD camera 13 is disposed such that the light receiving surface thereof is perpendicular to a center axis along the extension of the muzzle 10a (equivalent to an axis connecting the targeted position on the display screen 1a and the model gun 10).

Indicated at 14 is a focusing lens, and by 15 an infrared ray transmitting filter. The focusing lens 14 and the filter 15 are disposed in front of the light receiving surface of the CCD sensor. More particularly, the focal length of the focusing lens 14 and a distance thereof to the CCD sensor are set such that a clear image is formed on the light receiving surface of the CCD sensor. The filter 15 passes only the light having a wavelength within the range of infrared rays therethrough. More preferably, the filter 15 passes only the light having a wavelength corresponding to the infrared beams emitted from the infrared beam projector 4 therethrough.

Figure 3:
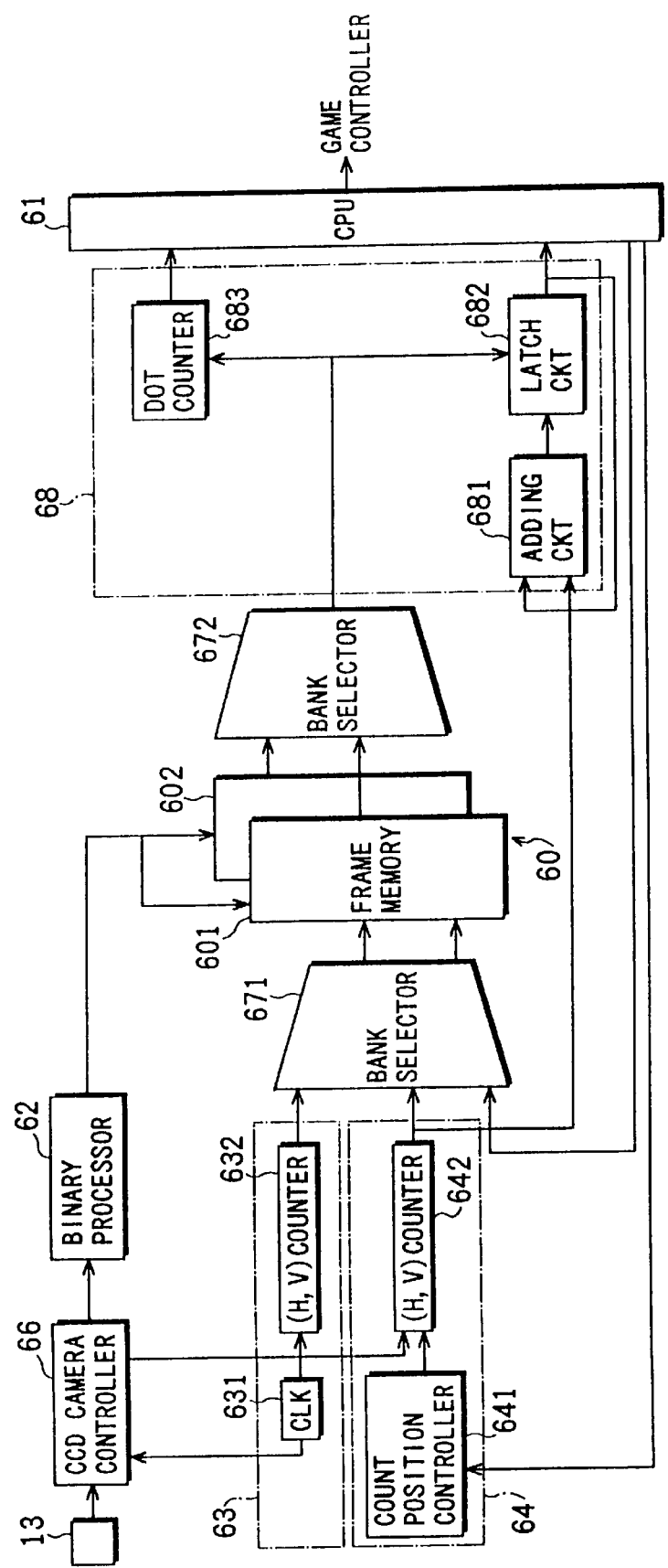
FIG. 3 is a detailed block diagram of a position detector.

FIG. 3 is a detailed block diagram of the position detector 6.

A binary processor 62 converts the image picked up by the CCD camera 13 into a binary data having two levels: high and low, and introduces it to a frame memory 60. In this processing, the binary levels (i.e. threshold values) can be suitably adjusted by changing a reference voltage according to a light reception sensitivity. The frame memory 60 includes a frame memories 601, 602 each having a storage capacity corresponding with or to the number of pixels of the CCD camera 13. The image data is stored in the frame memory 60 by alternately switching the frame memories 601, 602 in a field cycle (half of a frame cycle) or in a frame cycle by selection. In this embodiment, the CCD camera 13 outputs an image data obtained by the pixels arranged in a matrix (512×512), and the storage capacity and the addresses of the frame memories 601, 602 are determined based on these pixels.

Indicated at 63 is a write address generator for generating a write address of the frame memory 60, and includes a reference clock generator 631 for outputting a reference clock pulse of, e.g. 14 MHz and a (H, V) counter 632 for generating an address (H, V). The counter 632 outputs a write address used to scan all the addresses of the frame memory 60 at a speed synchronized with the field cycle. The binary data from the binary processor 62 is written alternately in the frame memories 601, 602 in accordance with the address output from the counter 632.

Indicated at 64 is a read address generator for generating a read address corresponding to a specified area within the frame memory 60 (hereafter, "count block"), and includes a count position controller 641 for setting a start position in a count block and a (H, V) counter 642. The read address generator 64 starts operating after an initial position confirmation to be described later, and generates a read address of the count block in accordance with a start address (Hs, Vs) of the count block and a count block size data. In this way, only the binary data within the count block are read.

A CCD camera controller 66 Generates a synchronization signal and a camera synchronization signal in accordance with the reference clock from the reference clock generator 631. In accordance with these signals, the controller 66 switches the frame memories and synchronizes a scanning cycle and scanning timing of the CCD camera 13 with generation of addresses of the frame memories.

Indicated at 671, 672 are multiplexers as bank selectors. The multiplexer 671 suitably switches PC addresses from the (H, V) counters 632, 642 and a CPU 61 for position detection and introduces it to the frame memory 60. The multiplexer 672 switches the output sides of the frame memories 601, 602.

Indicated at 68 is a data integrator including an adding circuit 681, a latch circuit 682 and a dot counter 683. The integration result is sent to the CPU 61 where the targeted position is calculated based on the integration result.

FIGS. 4A to 4C are diagrams showing the operation of a data integrator, FIG. 4A showing a display screen 1a within a field of view of a CCD camera, FIG. 4B showing an image obtained by the CCD camera when an image on the display screen 1a is picked up, and FIG. 4C showing an enlarged view of a count block (BL).

In the description below, unless particularly specified, H- and V-axes correspond to lateral and longitudinal directions of the display screen 1a, respectively and an origin of the coordinate system is located at the upper left corner of the display screen 1a. Similarly, X- and Y-axes correspond to lateral and longitudinal directions of the image picked up by the CCD camera 13. The coordinates at the upper left corner are (1, 1) and the coordinates at the lower right corner are (512, 512) in FIG. 4B.

In FIG. 4A, a game screen image GP is projected on the display screen 1a, and the infrared spot beams LSl, LSr are also projected thereon at its opposite lateral ends. In FIG. 4B, spot beam data Dl, Dr corresponding to the left and right infrared spot beams LSl, LSr are in high level. It should be noted that BL denotes a count block.

In FIG. 4C, each square within the count block BL denotes a pixel of the CCD camera 13, i.e. each address of the frame memory 60. An address (Hs, Vs) at the left upper corner of the count block BL is a start address of the count block, and is set by the count position controller 641. The (H, V) counter 642 designates addresses from the start address (Hs, Vs) in a row direction (a direction indicated by an arrow in FIG. 4C): (Hs+1, Vs), . . . , (Hs+h, Vs). Upon completion of one row, addresses are designated to a next row. The address designation is completed at an end address (Hs+h, Vs+v). In this way, there can be designated the count block BL as a matrix of h×v.

By suitably selecting a lens to be disposed on a sensing surface of the CCD camera 13 and the shape and luminance of the infrared spot beams LSl, LSr, the spot beam data Dl, Dr can be written over a plurality of addresses as shown by a hatched portion in FIG. 4C. By forming the spot beam data by a plurality of dots in this way, it can be made distinguishable from noise.

An integration processing is described with reference to FIGS. 3 to 4C. Upon address designation for the count block BL from the read address generator 64, the contents stored in the addresses of the frame memory 601 (or 602) are successively read and the read addresses are sent to the adding circuit 681.

Each time the dot data (high level data) constituting the spot beam data Dl is read from the frame memory 601, a count value of the dot counter 683 is incremented and the read dot data is introduced to the latch circuit 682. The latch circuit 682 latches an address value output from the adding circuit 682 only when it receives the dot data, and sends this value back to the adding circuit 681 again. In this way, each time the dot data is output from the frame memory 601, the values of the address in which the dot data is stored is output to and integrated by the adding circuit 681.

As a result, the number of dots existing in the count block BL is counted by the dot counter 683, and an integrated value of the addresses in which the dot data are stored is read by the latch circuit 682. Upon completion of address designation for the count block BL, the CPU, 61 reads the data obtained by the latch circuit 682 and the dot counter 683. The CPU 61 discriminates based on the number of dots whether the spot beam data is a noise, and calculates an address of a center dot (Hc, Vc) by dividing the integrated value by the number of dots. This center address is assumed to be a centroid of the entire screen image. The count block is set and the targeted position is detected based on the centroid data.

A technique adopted to discriminate whether the spot beam data is noise may be such that there is provided, e.g. a threshold value for the number of dots, and a data is discriminated to be a spot beam data when the number of dots is larger than the threshold value. Further, the center address may be calculated by a hardware construction, and only the calculation result may be sent to the CPU 61. Furthermore, instead of absolute coordinates, relative coordinates from reference coordinates may be used to integrate values of the coordinates, and the integrated values may be added to the reference coordinates at the end to obtain target coordinates. This advantageously leads to a faster adding operation of the hardware because the number of dots to be treated is reduced.

Next, the operation of the shooting game machine according to this embodiment is described with reference to flowcharts shown in FIGS. 5 to 9, 10 and 11.

(1) Game Processing (FIG. 5)

FIG. 5 is a flowchart showing the operation of the program implemented by the game controller 5. First, the entire system is initialized in Step S1, and a game data processing is performed to generate a game screen image in Step S2. The game data processing includes, e.g. a polygon processing for generating character(s) and the like in the screen image by means of a polygon. The game data processing is performed in every field cycle. In other words, in every field cycle, a video signal is sent from the game controller 5 to the projector 2 to write a new game screen image over the old one.

The trigger signal from the model gun 10 is checked in Step S3, and it is discriminated whether the trigger signal is in ON state in Step S4. If the trigger signal is in ON state, i.e. the player has pulled the trigger 11 of the model gun 10, Step S5 follows. On the contrary, if the trigger signal is in OFF state, i.e. the player has not pulled the trigger 11, Step S9 follows.

In Step S5, a data concerning the targeted position (H, V) data detected by the position detector 6 is read. The operation of the position detector 6 is described later. In Step S6, it is discriminated whether the targeted position (H, V) read in Step S5 is (0, 0), i.e. the targeted position is located outside the game screen image. Step S8 follows if the discrimination result is in the affirmative, whereas S7 follows if it is in the negative. In Step S7, a data processing corresponding to the detected targeted position is performed. This data processing includes, e.g. counting of the number of shooting, discrimination as to whether the target was targeted, and decrement of the number of remaining bullets.

On the other hand, in Step S8, a processing corresponding to the case where the targeted position was located outside the game screen image is performed. Specifically, no processing, may be performed or a message such as "MISSED" may be displayed. In this embodiment, the model gun 10 is loaded.

In Step S9, an end check is performed in accordance with a specified game rule. The game program ends when end conditions are satisfied and, unless otherwise, this routine returns to Step S2 to repeat the above operation.

Figure 6:
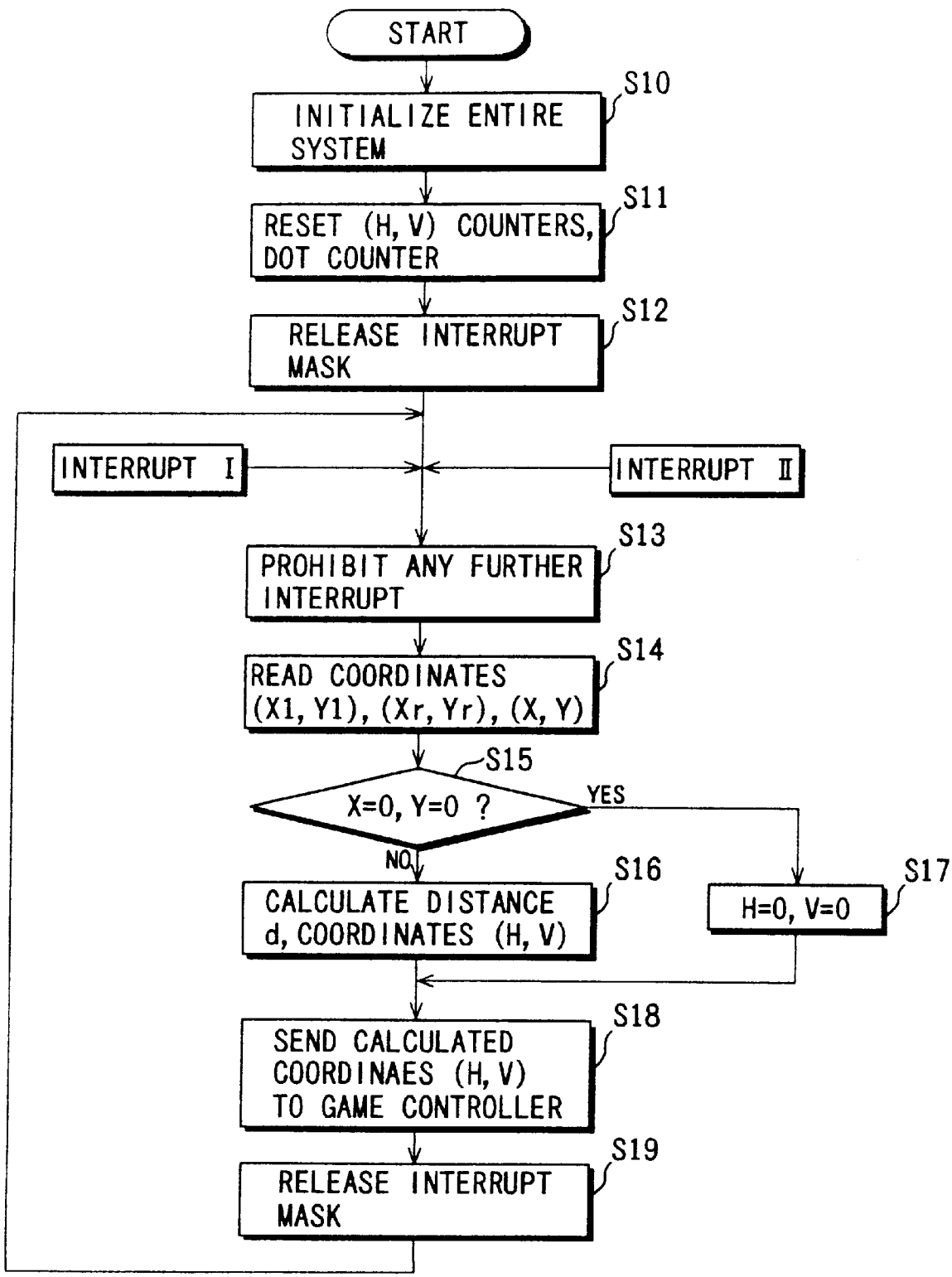
FIG. 6 is a flowchart showing the operation of a program implemented by the position detector.

(2) Position Detection (FIG. 6)

FIG. 6 is a flowchart showing the operation of the program implemented by the position detector 6.

Figure 10A:
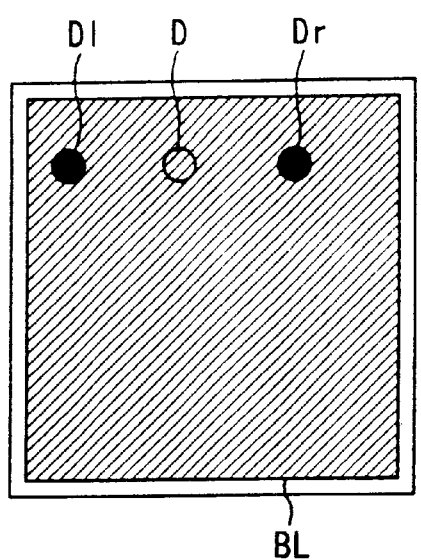
FIGS. 10A to 10C are diagrams showing how a range of the count block is set.
Figure 10B:
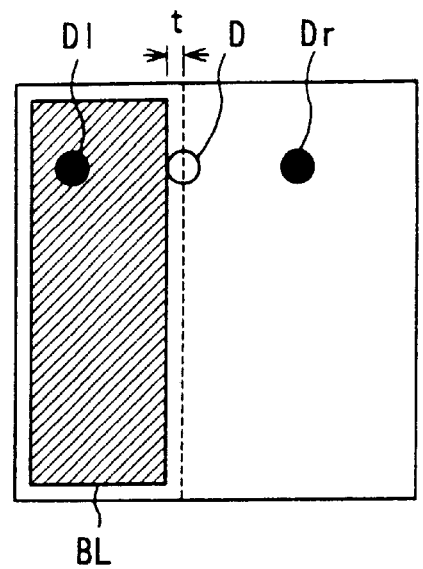
Figure 10C:
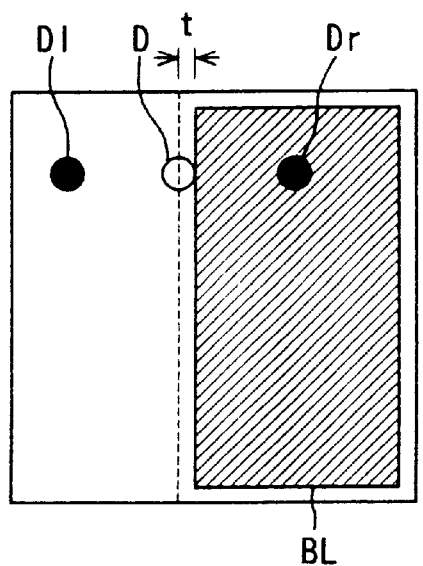

First in this embodiment, the count block BL is so set as to cover the entire image picked up by the CCD camera 13 as shown in FIG. 10A, and the centroid D (X, Y) of the left and right spot beam data Dl (Xl, Yl) and Dr (Xr, Yr) is calculated. Subsequently, the count block BL is so set as to cover the image on the left of the center position, or centroid D as shown in FIG. 10B to calculate the left spot beam data Dl (Xl, Yl). Further, the count block BL is so set as to cover the image on the right of the centroid D as shown in FIG. 10C to calculate the right spot beam data Dr (Xr, Yr). The targeted position is detected based on the left and right spot beam data Dl, Dr and a distance between these data.

During this processing, the count block BL is set on the assumption that the spot beam data Dl, Dr do not exist in an area defined by the width of the spot beam data Dl, Dr centering the centroid D (an area defined by t pixels on the left and right of the centroid D) as shown in FIGS. 10B and 10C. Accordingly, the start address and the end address in FIGS. 10A to 10C are set as follows.

[Equation 1]

1: Entire Image (FIG. 10A)

$Hs = 1 \quad h = 511(Hs + h = 512)$ $Vs = 1 \quad v = 511(Vs + v = 512)$

2. Left Image (FIG. 10B)

$Hs = 1 \quad h = X - t - 1(Hs + h = X - t)$ $Vs = 1 \quad v = 511(Vs + v = 512)$ 3. Right Image (FIG. 10C)

$Hs = X + t \quad h = 512 - X - t(Hs + h = 512)$ $Vs = 1 \quad v = 511(Vs + v = 512)$ The data width t may be an empirically obtained known value or may be calculated using an actual measurement value obtained when the count block BL is set to cover entire image.

In FIG. 6, the entire system is initialized in Step S10. In Step S11, the respective counters (the (H, V) counters 632, 642 and the dot counter 683) in the position detector 6 are reset. In Step S12, an interrupt mask is released, thereby entering an interrupt waiting state. In the embodiment, there are prepared two interrupt routines.

Figure 7:
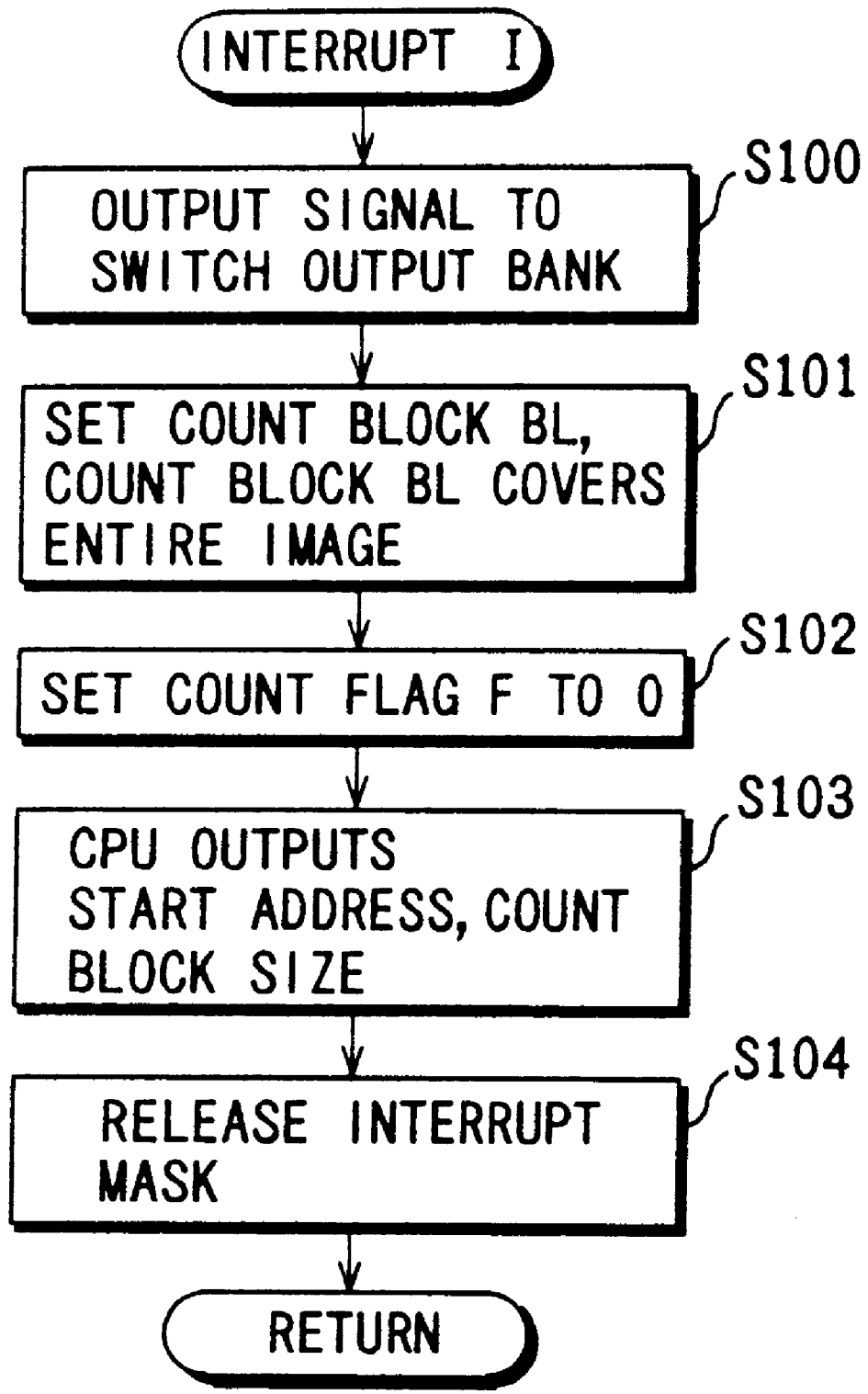
FIG. 7 is a flowchart showing an interrupt routine I.

FIG. 7 is a flowchart showing the operation of an interrupt routine I. The interrupt routine I starts upon receipt of an interrupt signal generated each time the image data is completely written in the frame memory 601 (or 602). First in Step S100, a signal used to switch an output bank to the frame memory 601 (or 602) in which the image data has been completely written is output to the multiplexer 672.

Subsequently, in Step S101, the count block BL is set. Specifically, the start address (Hs, Vs) and the end address (Hs+h, Vs+v) of the count block BL are set. In this step, the count block BL covers the entire image picked up by the CCD camera 13 (see FIG. 10A). In Step S102, a count flag F is set to 0. The count flag F indicates what kind of block is set as the count block BL. The value of the flag F has the following meanings:

| | | |
|---|---|---|
| F = 0 | . . . | Entire Image (FIG. 10A) |
| F = 1 | . . . | Left Image (FIG. 10B) |
| F = 2 | . . . | Right Image (FIG. 10C) |

In Step S103, the CPU 61 outputs the start address (Hs, Vs) and the count block size (h, v) to the count position controller 641, thereby instructing a start of counting. In Step S104, an interrupt mask is released, entering the interrupt waiting state.

Figure 8:
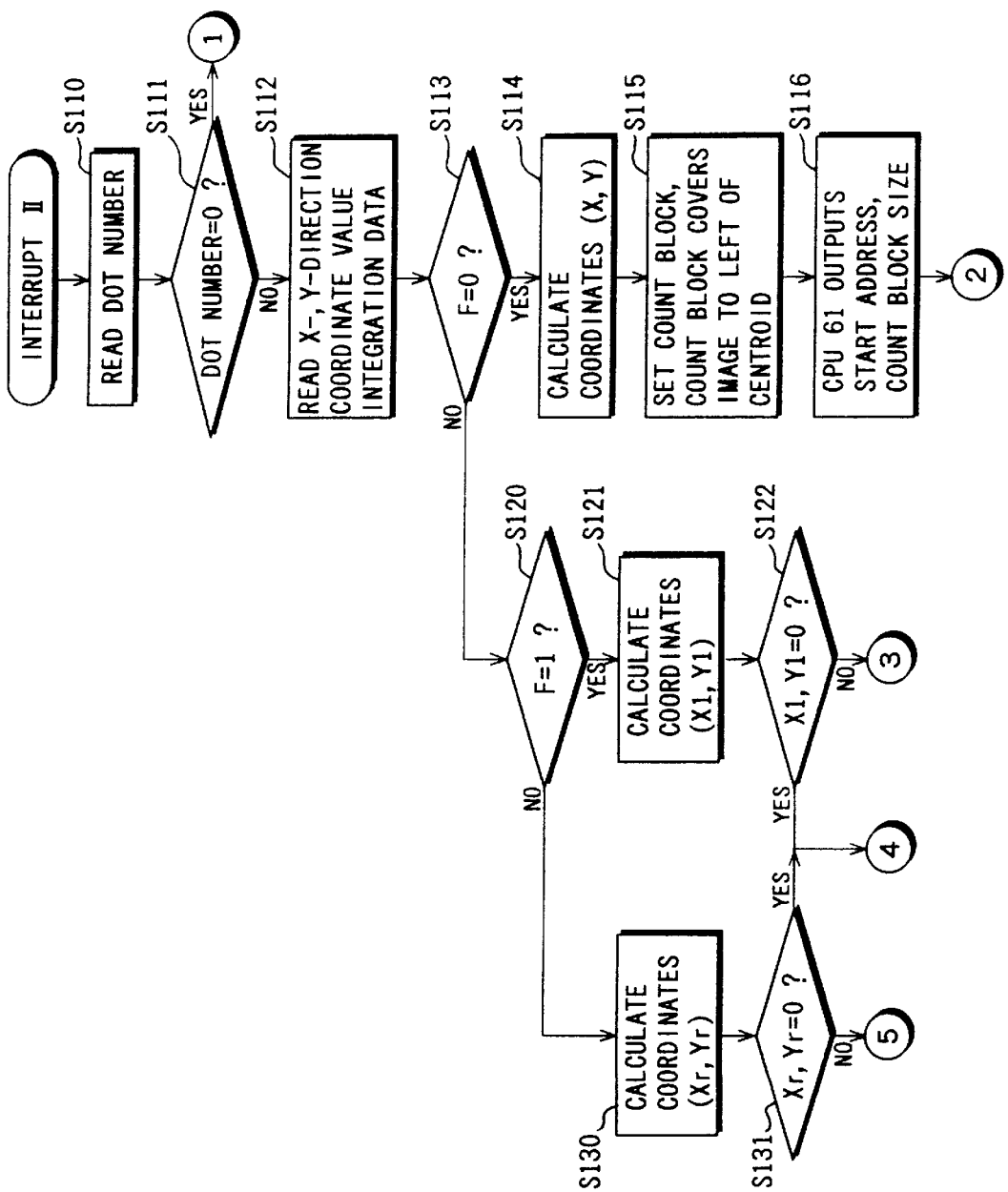
FIGS. 8 and 9 are flowcharts showing an interrupt routine II.
Figure 9:
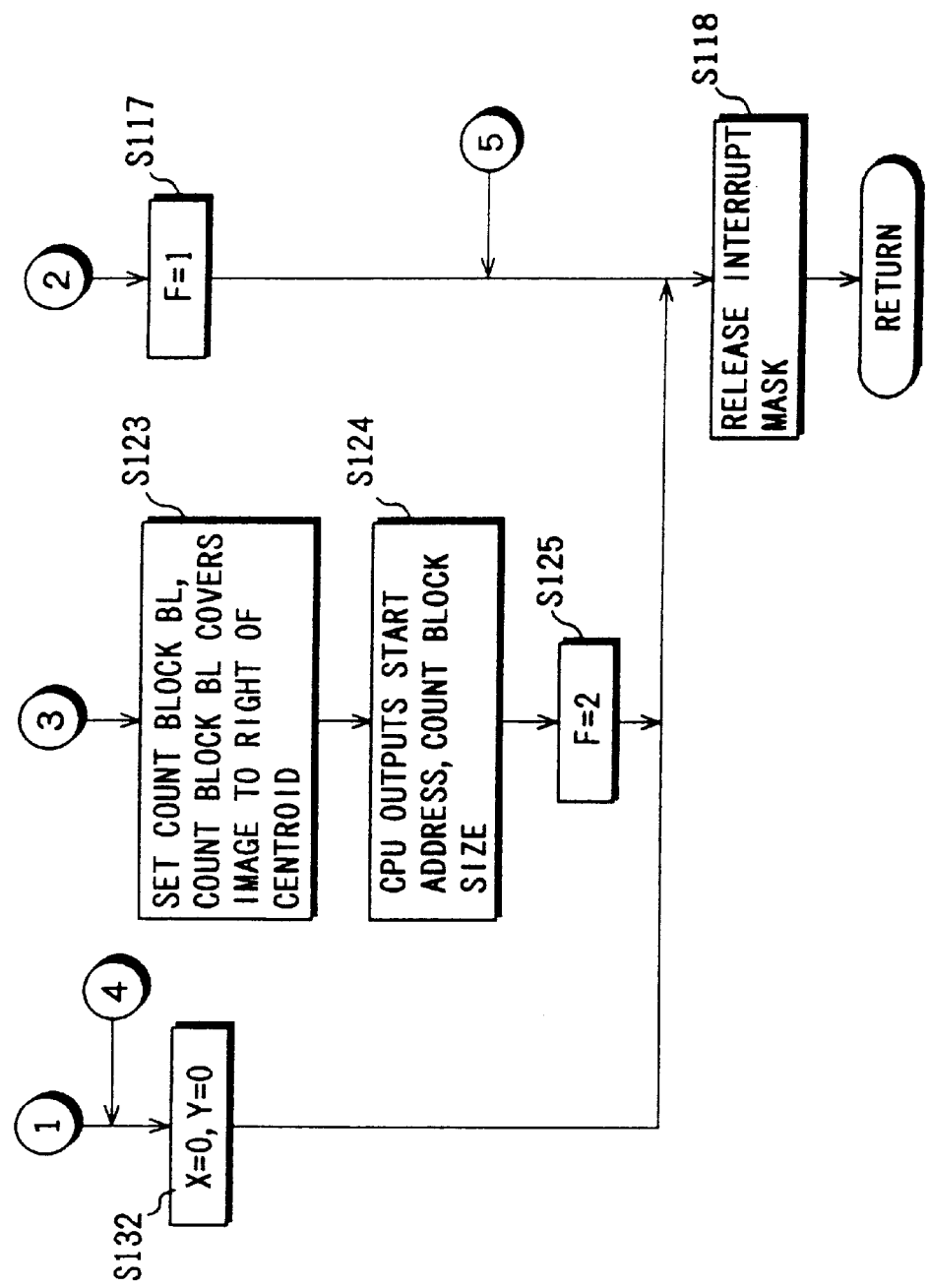

FIGS. 8 and 9 are flowcharts showing the operation of an interrupt routine II. The interrupt routine II starts upon receipt of an interrupt signal generated each time the (H, V) counter 642 completes the address designation of the count block BL.

First in Step S110, the dot number is read from the dot counter 683. In Step S111, it is discriminated whether the read dot number is 0. If the discrimination result is in the affirmative, Step S132 follows in which a specific centroid data (X, Y)=(0, 0) is set upon determination that the left and right spot beams LSl, LSr were not sensed by the CCD camera 13. On the other hand, if the discrimination result is in the negative, Step S112 follows in which the X- and Y-direction coordinate value integration data are read from the latch circuit 682.

In Step S113, it is discriminated whether the count flag F is set at 0. If the discrimination result is in the affirmative, Step S114 follows in which the coordinates (X, Y) of the center data D of the left and right spot beam data Dl, Dr are calculated in accordance with the following equation (3):

X=Integrated Value of Dot Counter in X-Direction/Value of Dot Counter

Y=Integrated Value of Dot Counter in Y-Direction/Value of Dot Counter

In Step S115, the count block BL is set again. In Step S115, the count block BL covers the image to the left of the centroid D (see FIG. 10B). In Step S116, the CPU 61 outputs the start address (Hs, Vs) and the count block size (h, v) to the count position controller 641, thereby instructing a start of counting. In Step S117, the count flag F is set to 1. In Step S118, the interrupt mask is released, thereby entering the interrupt waiting state.

On the other hand, if the discrimination result in Step S113 is in the negative, Step S120 follows in which it is discriminated whether the count flag F is set at 1. If the discrimination result is in the affirmative, Step S121 follows in which the coordinates (X, Y) of the center data D of the left and right spot beam data Dl, Dr are calculated in accordance with the following equation (4):

Xl=Integrated Value of X-Direction Coordinate Value of L Block/Value of Dot Counter Yl=Integrated Value of Y-Direction Coordinate Value of L Block/Value of Dot Counter In Step S122, it is discriminated whether the coordinates (Xl, Yl) of the left spot beam data Dl calculated in Step S121 is (0, 0). If the discrimination result is in the affirmative, Step S132 follows in which the specific targeted position data (H, V)=(0, 0) is set in upon determination that the left infrared spot beam LSl was not sensed by the CCD camera 13. On the other hand, if the discrimination result is in the negative, Step S123 follows in which the count block BL is set again. In Step S123, the count block BL covers the image to the right of the centroid D (see FIG. 10C). In Step S124, the CPU 61 outputs the start address (Hs, Vs) and the count block size (h, v) to the count position controller 641, thereby instructing a start of counting. In Step S125, the count flag F is set to 2. Thereafter Step S118 follows, entering the interrupt waiting state.

On the other hand, if the discrimination result in Step S120 is in the negative, Step S130 follows in which the coordinates (Xr, Yr) of the right spot beam data Dr are calculated in accordance with the following equation (5):

Xr=Acumulated Value of X-Direction Coordinate Value of R Block/Value of Dot Counter Yr=Accumulated Value of Y-Direction Coordinate Value of R Block/Value of Dot Counter In Step S131, it is discriminated whether the coordinates (Xr, Yr) of the right spot beam data Dr calculated in Step S130 is (0, 0). If the discrimination result is in the affirmative, Step S132 follows in which the specific targeted position data (H, V)=(0, 0) is set upon determination that the right infrared spot beam LSr was not sensed by the CCD camera 13. On the other hand, if the discrimination result is in the negative, Step S118 follows, entering the interrupt waiting state.

Referring back to FIG. 6, upon completion of the interrupt routine II, any further interrupt is prohibited in Step S13. Subsequently, in Step S14, the coordinates (Xl, Yl), (Xr, Yr) of the left and right spot beam data Dl, Dr and the coordinates (X, Y) of the centroid D are read.

In Step S15, it is discriminated whether the coordinates (X, Y) of the centroid D read in Step S14 are (0, 0). If the discrimination result is in the affirmative, the specific targeted position data (H, V)=(0, 0) is set in Step S17 upon determination that either one of the left and right infrared spot beams LSl, LSr was not sensed by the CCD camera 13 (corresponding to Step S132 of FIG. 9), i.e. the targeted position is located outside the display screen 1a. On the other hand, if the discrimination result is in the negative, upon determination that both the left and right infrared spot beams LSl, LSr was sensed by the CCD camera 13, i.e. the targeted position is located within the display screen 1a, there are, in Step S16, calculated the distance d between the left and right spot beam data Dl and Dr and the coordinates (H, V) of the targeted position on the display screen 1a.

The calculation method is specifically described. The distance d between the left and right spot beam data Dl, Dr is calculated based on the coordinates (Xl, Yl), (Xr, Yr) of the left and right spot beam data Dl, Dr in accordance with the equation (6):

$$d=\sqrt{(Xl-Xr)^2+(Yl-Yr)^2}$$

Figure 11:
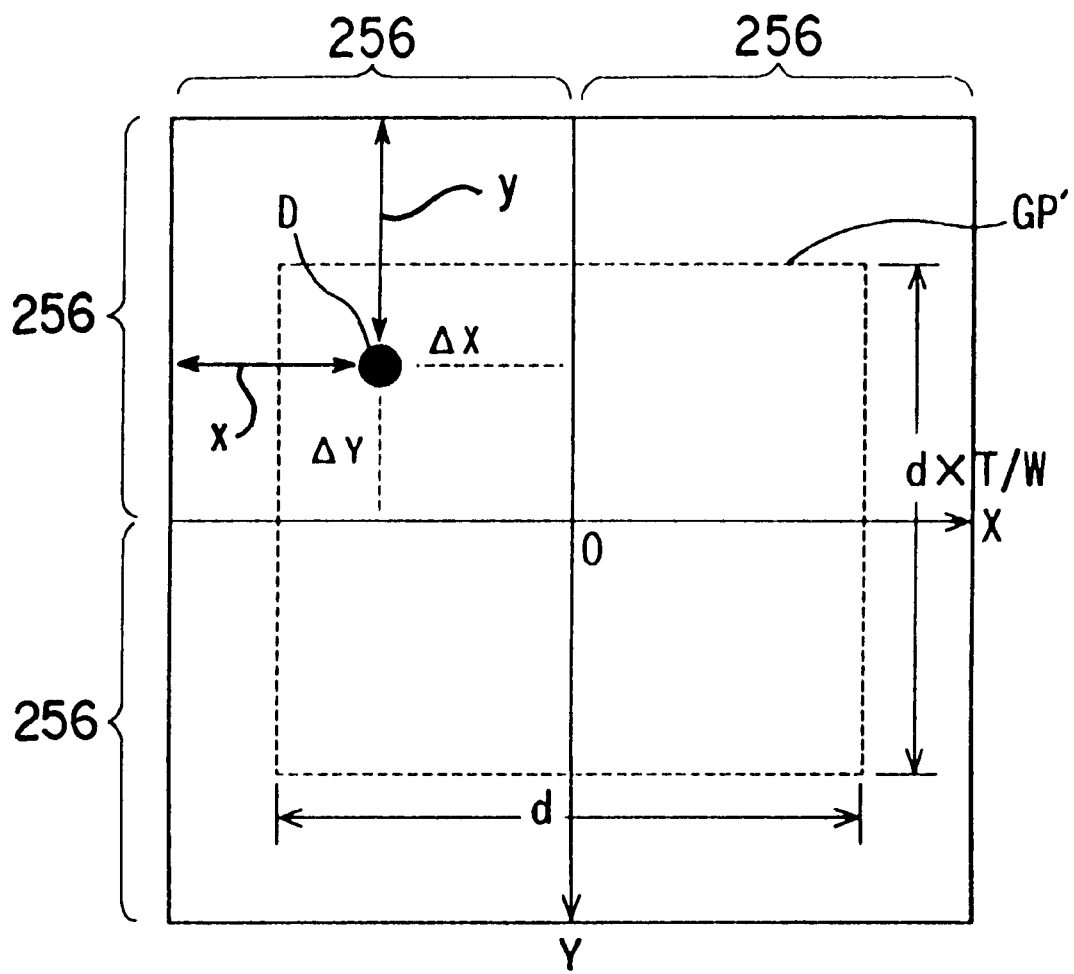
FIG. 11 is a diagram showing how a targeted position is detected

Next, a coordinate transformation is applied to locate the origin O in the center of the image picked up by the CCD camera 13 as shown in FIG. 11. A virtual window GP' corresponding to the game screen image GP (the width of the window GP' is equal to the aforementioned distance d) is formed within the image after the coordinate transformation. Since the shape of the game screen image GP is similar to that of the display screen 1a as shown in FIG. 4A, the shape of the virtual window GP' is similar to that of the display screen 1a. Accordingly, if it is assumed that W, T denote the width and height of the display screen 1a, respectively, distances $\Delta X$, $\Delta Y$ of the centroid D from the origin O in the X- and Y-directions are obtained in accordance with the following equation (7):

$$\Delta X=256-X$$

$$\Delta Y=256-Y$$

Accordingly, the coordinates of the origin of the virtual window GP' on the display screen 1a, i.e. the coordinates (D'h, D''v) of the targeted position are obtained in accordance with the following equation (8):

$$D'h=W/2+\Delta X(L/d)$$

$$D'v=T/2+\Delta Y(L/d)$$

If the game screen image GP is projected substantially over the entire display screen 1a, the coordinate values D'h and D'v can be calculated in the following equation (9) by omitting the first terms on the right side of the above equations on the assumption that W=L and by replacing L with W:

$$D'h=W/2+\Delta X(W/d)$$

$$D'v=T/2+\Delta Y(W/d)$$

On the other hand, a distance D between the model gun 10 and the display screen 1a can be calculated in accordance with the equation (10): $D \approx f \cdot L/d$. In this equation, f denotes a focal length of the focusing lens 14.

Referring back to FIG. 6, in Step S18, the coordinates (H, V) corresponding to D'h and D'v of the targeted position calculated in Step S16 (or in Step S17) are sent to the game controller 5. In Step S19, the interrupt mask is released, thereby entering the interrupt waiting state. Upon completion of implementation of the interrupt routine, the operations after Step S13 are repeated.

According to the shooting game machine of the foregoing embodiment, the infrared spot beams LSl, LSr projected at the opposite lateral ends of the game screen image are sensed by the CCD camera 13 built in the model gun 10, and the targeted position of the model gun 10 is detected based on the positions of the sensed spot beams. Accordingly, unlike the prior art shooting game machine, it is not necessary to turn the display screen white each time the trigger signal is received from the model gun 10. Thus, the game screen images can be continuously displayed, thereby improving the quality of the game screen images and reducing a likelihood that the player gets dazzled.

Further, according to the shooting game machine of the foregoing embodiment, the targeted position can be detected at intervals synchronized with a game screen image writing cycle (field cycle in the embodiment). Thus, the position can be substantially continuously detected when it is necessary to continuously display the targeted position such as a display of the targeted position during the calibration. The position detection is described with reference to FIGS. 12 and 13.

FIGS. 12A to 12E are timing charts of main signals used in a prior art shooting game machine, FIG. 12A showing a blanking signal of the display device, FIG. 12B an I/O_READ signal of the game controller, FIG. 12C a trigger signal of the model gun, FIG. 12D an output signal of the photodetector provided in the model gun, and FIG. 12E a latch signal of the (H, V) counter. Upon output of the trigger signal, the display screen turns white, with the result that the screen flashes. Simultaneously, raster scanning is performed to the white screen image, and the value of the (H, V) counter is latched when the raster scanning beam is detected by the photodetector. After completion of raster scanning for one screen image, the targeted position is detected at a latching timing of the value of the (H, V) counter and read by the game controller. Accordingly, the position detecting cycle cannot be shorter than the game screen image writing cycle because the raster scanning needs to be performed for one screen image until the position detection is completed after the trigger signal is output from the model gun.

FIGS. 13A to 13E are timing charts of main signals used in the shooting game machine of the foregoing embodiment, FIG. 13A showing a blanking signal of the projector 2, FIG. 13B a blanking signal of the CCD camera 13, FIG. 13C a targeted position detection signal output from the position detector 6, FIG. 13D the trigger signal of the model gun, and FIG. 13E an I/O_READ signal of the game controller 5. The blanking signal of the projector 2 and that of the CCD camera 13 are synchronized, and the targeted position detection signal is output in every field cycle. Immediately after the trigger signal is output from the model gun 10, the targeted position at that moment is read by the game controller 5. Accordingly, the targeted position can be continuously detected by synchronizing the field cycle with the position detecting cycle.

Further, according to the foregoing embodiment, the targeted position is detected using the infrared beam projector 4 for projecting the two infrared spot beams LSl, LSr and the CCD camera 13 built in the model gun 10. Accordingly, the construction is simpler than the prior art shooting game in which the light emitting elements are arranged in a matrix. Further, accurate assemblage and arrangement are not necessary since the targeted position can be detected if the distance between the infrared spot beams LSl, LSr and the dimensions of the display screen 1a (the width of the display screen 1a are measured.

Further, since the positions of the infrared spot beams are detected by the infrared CCD according to the foregoing embodiment, an influence of disturbance rays having a wavelength within the range of visible rays can be reduced, with the result that the system substantially uninfluenced by external noise can be constructed.

According to the foregoing embodiment, not only the targeted position on the display screen 1a, but also the distance D between the model gun 10 and the display screen 1a can be estimated. Thus, the game can be diversified by giving a point according to the distance D when the target is targeted. This makes the game more interesting.

The details of the shooting game machine according to the invention are not limited to the foregoing embodiment, but can be modified in a variety of manners. For instance, although the targeted position is detected by the positions of the two picked up image representing the infrared spot beams in the foregoing embodiment, the number of infrared spot beams is not limited to two. Further, a means for generating the infrared spot beams may be suitably chosen from known means. For example, it may be an infrared ray emitting diode (IRED), a laser (may be a gas laser, liquid laser, solid laser or semiconductor laser), or an incandescent lamp having, an emission characteristic within the range of infrared rays. The position of the means for generating the infrared spot beams is not limited to the position according to the foregoing embodiment. For example, in the case that the light path is turned by the semitransparent mirror as in the foregoing embodiment, the means may be disposed behind the semitransparent mirror.

If an image pick-up device called a "CCD card camera" in which a CCD sensor and a processor are formed on a single substrate is used, it makes the model gun lighter and leads to an easier maintenance. On the other hand, it may be also appropriate that only the CCD sensor be provided in the model gun and that all processors be formed on the substrate where the position detector is formed.

Although the targeted position is detected by picking up the images of the infrared spot beams as references by means of the CCD camera in the foregoing embodiment, the references may not be limited to the infrared spot beams. For example, ultraviolet rays, acoustic waves, electromagnetic waves may be projected forward of the screen. In consideration of the possibility of being seen by the player and subject to disturbance light, visible rays may be projected forward of the screen.

As described above, according to the invention, the image of the reference disposed in the vicinity of the display screen is picked up by the image pick-up device built in the hitting device and the position targeted by the hitting device is detected based on the detected position of the reference. Accordingly, unlike the prior art shooting game machine, it is not necessary to turn the display screen white each time the trigger signal is output from the model gun or hitting-device. Thus, the game screen image can be continuously displayed, thereby improving the quality of the game screen image and reducing a likelihood that the player gets dazzled.

The targeted position is detected using the reference disposed in the vicinity of the display screen and the image pick-up device for picking up the image of the reference. Accordingly, the construction is simpler than the prior art shooting game machine in which light emitting elements are arranged in a matrix, and precise assemblage and arrangement are not necessary.

Further, the position of the reference can be detected at high speed during one scanning, i.e. at intervals synchronized with the writing cycle of the display screen. Thus, the position can be substantially continuously detected when it is necessary to continuously display the targeted position such as a display of the targeted positing during the calibration.

Furthermore, since the data within the designated area (count block) is used, the targeted position can be more rapidly detected.

In addition, the targeted position can be detected by a simpler construction.

The targeted position can be more accurately detected by using a plurality of references. Particularly, by eliminating the influence of noise the targeted position can be far more accurately detected.

Further, the use of the distance between the targetting device and the display screen diversifies the game, thereby making it more interesting.

Further, there can be constructed a system which is not subject to disturbance light having a wavelength within the range of visible rays and is, accordingly, uninfluenced by external noise.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A targeting game machine comprising:
    a display device having a display screen for displaying a target;
    a targeting device for targeting the target;
    a reference emitter disposed to emit a reference signal from a vicinity of the display screen;
    the targeting device having an image pick-up device which picks up an image in an image area facing the targeting device;
    a reference position detector which detects the position of the reference signal within the image picked up by the image pick-up device; and
    a targeted position detector which detects a position on the display screen targeted by the targeting device based on the position of the reference signal detected by the reference position detector.

2. A targeting game machine according to claim 1, wherein the image pick-up device includes image receiving elements arranged in a matrix for receiving electromagnetic waves from the image area for each scanning of the image area, said reference signal is electromagnetic waves and the reference position detector detects the position of the reference signal in accordance with an image signal output from the image pick-up device for each scanning.

3. A targetting game machine according to claim 2, wherein the reference position detector includes a frame memory which stores the image signal output from the image pick-up device, and an area designator which designates at least a partial area of the frame memory, whereby the reference position detector reads contents stored in the area of the frame memory designated by the area designator and detects the position of the reference signal based on the read contents.

4. A targeting game machine according to claim 3, wherein the reference position detector further includes a counter which counts the number of image receiving elements which picked up the reference signal based on the contents stored in the area of the frame memory designated by the area designator, and a coordinate values integrator which integrates coordinate values of the image receiving elements in the frame memory which were counted by the counter, whereby the reference position detector detects the position of the reference signal based on outputs of the counter and the coordinate value integrator.

5. A targeting game machine according to claim 4, comprising two or more references emitters for emitting reference signals, wherein the area designator designates the area in accordance with the image signal from the image pick-up device such that only one of said reference signals is located within the area.

6. A targeting game machine according to claim 5, further comprising a distance estimator which estimates a distance between the targeting device and the display screen based on a distance between the reference signals detected in the image pick-up device and an actual distance between the reference signals.

7. A targeting game machine according to claim 1, comprising two or more reference emitters for emitting reference signals.

8. A targeting game machine according to claim 1, wherein the reference emitter emits electromagnetic waves having a wavelength outside the range of visible rays, and the image pick-up device selectively receives the electromagnetic waves from the reference emitter.

9. A method of detecting a targeted position of a targeting device for use in a targeting game machine including a display device having a reference disposed in a display screen, the targeting device having an image pick up device for picking up an image in an image area, a reference position detector for detecting a reference position of the reference within the image picked up by the image pick up device and a targeted position detector for detecting a targeted position targeted by the targeting device, the method comprising the steps of:
    detecting the reference position in the image picked up by the image pick up device; and
    detecting the targeted position targeted by the targeting device with respect to the reference position.

10. The method according to claim 9, wherein the reference is a pair of references disposed in the display device at a certain distance apart from each other, and the method further comprises the step of calculating a distance between the pair of references picked up by the image pick up device.

11. The method according to claim 10, further comprising the steps of:
    calculating a coordinate of a centroid of the pair of references in the image picked up by the image pick up device;
    calculating an address corresponding to the targeted position in the image picked up by the image pick up device; and
    converting the address corresponding to the targeted position in the image picked up by the image pick up device into an address in the display screen.

12. The method according to claim 11, further comprising the step of judging if the address corresponding to the targeted position in the display screen is within a target displayed on the display screen.

13. A targeting game machine comprising:
    a display device having a display screen for displaying a target;
    a targeting device for targeting the target;
    a reference disposed in the display screen;

the targeting device having an image pick up device for picking up an image of the display screen;

a reference position detector for detecting a position of the reference in the image picked up by the image picked up device; and a targeted position detector for detecting a targeted position targeted by the targeting device in the image picked up by the image pick up device based on the position of the reference.

14. The targeting game machine according to claim 13, further comprising a converter for converting the targeted position detected by the targeted position detector into a coordinate in the display device.

15. The targeting game machine according to claim 13, further comprising a second reference disposed in the display screen.

16. The targeting game machine according to claim 15, wherein the reference position detector includes:

a counter;

a coordinate value integrator for summing up coordinate values of the first and second references;

means for calculating an address of a centroid of the first and second references as follows:

sum of coordinate values of the references stored in the coordinate value integrator/a number of data corresponding to the references stored in a counter where "/" indicates a division.

17. The targeting game machine according to claim 13, further comprising a projector with a projecting portion for projecting a beam on the display screen and the beam projected on the display screen corresponding to the reference.

18. The targeting game machine according to claim 17, wherein the projector is set movable such that a posit ion of the reference on the display screen is changeable.

19. The targeting game machine according to claim 18, wherein the projector includes a pair of projecting portions for projecting beams onto the display screen and the beams projected on the display screen correspond to the pair of references.

20. The targeting game machine according to claim 19, wherein the position of the projector with respect to the display screen is adjustable such that a distance between the pair of references is changeable.

* * * * *